(12) United States Patent
Devereaux et al.

(10) Patent No.: US 11,537,444 B2
(45) Date of Patent: Dec. 27, 2022

(54) RENDERING

(71) Applicant: Google LLC, Mountain View, CA (US)

(72) Inventors: Sean Patrick Devereaux, Newton, MA (US); Brian Gregory Cipriano, Cambridge, MA (US); Brian Frederick Drewes, Brookline, MA (US)

(73) Assignee: Google LLC, Mountain View, CA (US)

( * ) Notice: Subject to any disclaimer, the term of this patent is extended or adjusted under 35 U.S.C. 154(b) by 75 days.

(21) Appl. No.: 16/719,886

(22) Filed: Dec. 18, 2019

(65) Prior Publication Data

US 2020/0125421 A1 Apr. 23, 2020

Related U.S. Application Data

(62) Division of application No. 15/185,376, filed on Jun. 17, 2016, now Pat. No. 10,534,651, which is a
(Continued)

(51) Int. Cl.
*G06F 9/50* (2006.01)
*G06Q 50/18* (2012.01)
(Continued)

(52) U.S. Cl.
CPC ............ *G06F 9/5077* (2013.01); *G06F 9/455* (2013.01); *G06F 9/45558* (2013.01);
(Continued)

(58) Field of Classification Search
CPC ........... G06F 2009/45595; G06F 9/455; G06F 9/45558; G06F 9/5077; H04L 65/605;
(Continued)

(56) References Cited

U.S. PATENT DOCUMENTS

| 7,844,968 B1 | 11/2010 | Markov |
| 2005/0198636 A1 | 9/2005 | Bareness |

(Continued)

FOREIGN PATENT DOCUMENTS

EP    2538328    12/2012

OTHER PUBLICATIONS

'en.wikiepida.org' [online] "Yonoy" "Pool (computer science)", Last updated Jul. 29, 2011, retrieved on Apr. 26, 2018] Retrieved from Internet: URL<https://en.wikipedia.org/w/index.php?title=pool_(computer_science)&oldid-442114061> 1 page.
(Continued)

*Primary Examiner* — Jason D Recek
(74) *Attorney, Agent, or Firm* — Honigman LLP; Brett A. Krueger

(57) ABSTRACT

This document describes methods, systems and computer program products related to cloud-based rendering. The subject matter of this document is embodied in a method that includes receiving, at a server, information associated with a job of rendering one or more frames at the server, and using, at the server, an application to perform at least a portion of the rendering. The use of the application to perform the rendering bears a charge according to a usage license associated with the application. The method also includes measuring, at the server, an amount of use of the application in performing the rendering for use in determining the charge.

18 Claims, 16 Drawing Sheets

Related U.S. Application Data division of application No. 13/826,847, filed on Mar. 14, 2013, now Pat. No. 9,384,517.

(51) Int. Cl.
*G06F 9/455* (2018.01)
*G06Q 30/02* (2012.01)

(52) U.S. Cl.
CPC ....... *G06Q 30/0283* (2013.01); *G06Q 50/184* (2013.01); *G06F 2009/45595* (2013.01)

(58) Field of Classification Search
CPC ..... H04L 67/06; H04L 67/1097; H04L 67/42; G06Q 30/0283; G06Q 50/184; G06Q 10/10
See application file for complete search history.

(56) References Cited

U.S. PATENT DOCUMENTS

| | | |
|---|---|---|
| 2007/0288551 A1 | 12/2007 | Sidon |
| 2008/0174598 A1 | 7/2008 | Risenhoover |
| 2008/0215468 A1 | 9/2008 | Monsa-Chermon et al. |
| 2009/0299905 A1* | 12/2009 | Mestha ............ G06Q 30/0603 705/76 |
| 2010/0153945 A1 | 6/2010 | Bansal |
| 2010/0289804 A1 | 11/2010 | Jackman et al. |
| 2011/0173637 A1 | 7/2011 | Brandwine |
| 2011/0179162 A1* | 7/2011 | Mayo ................... G06F 9/5077 718/1 |
| 2012/0271953 A1 | 10/2012 | Gulley et al. |
| 2012/0311153 A1 | 12/2012 | Morgan |
| 2013/0111468 A1* | 5/2013 | Davis ................... G06F 9/5077 718/1 |
| 2013/0179289 A1 | 7/2013 | Calder |
| 2013/0179574 A1 | 7/2013 | Calder et al. |
| 2013/0210522 A1 | 8/2013 | Dharmapurika |
| 2013/0227710 A1* | 8/2013 | Barak ..................... G06F 21/10 726/29 |
| 2013/0268757 A1* | 10/2013 | Kulkarni ................ G06F 21/33 713/168 |
| 2014/0095342 A1* | 4/2014 | Gowen ................ G06F 3/1272 705/26.5 |
| 2014/0237373 A1 | 8/2014 | Kennedy et al. |

OTHER PUBLICATIONS

Extended European Search Report issued in European Application No. 13869936.8 dated May 17, 2016, 9 pages.
International Preliminary Report on Patentability in International Application No. PCT/US2013/074326, dated Jul. 16, 2015, 8 pages.
International Search Report and Written Opinion dated Mar. 27, 2014 in international application No. PCT/US2013/074326, 9 pgs.
Office Action issued in European Application No. 13869936.8, dated Dec. 14, 2017, 7 pages.
Office Action issued in European Application No. 13869936.8, dated Feb. 21, 2019, 13 pages.
Raj et al. "Efficient Resource Allocation in Resource Provisioning Policies Over Resource Cloud Communication Paradigm," International Journal on Cloud Computing: Services and Architecture, vol. 2(3), Jun. 30, 2012, 8 pages.
Summons to Attend Oral Proceedings issued in European Application No. 13869936.8, dated May 11, 2018, 7 pages.
Yao et al. "A Distributed Render Farm System for Animation Production," Network and Parallel Computing; [Lecture Notes in Computer Science], Springer International Publishing, Sep. 3, 2009, 6 pages.

* cited by examiner

RENDERING

CROSS-REFERENCE TO RELATED APPLICATIONS

This application is a divisional application of and claims priority to U.S. application Ser. No. 15/185,376, filed on Jun. 17, 2016, which is a divisional application of and claims priority to U.S. application Ser. No. 13/826,847, filed on Mar. 14, 2013. The disclosure of each of the foregoing applications is incorporated herein by reference.

TECHNICAL FIELD

This disclosure relates to rendering.

BACKGROUND

In some cases, rendering is a process of creating frames of computer-generated images or videos from files, instructions, and commands.

SUMMARY

In one aspect, a method includes receiving, at a server, information associated with a job of rendering one or more frames at the server, and using, at the server, an application to perform at least a portion of the rendering. The use of the application to perform the rendering bears a charge according to a usage license associated with the application. The method also includes measuring, at the server, an amount of use of the application in performing the rendering for use in determining the charge.

In another aspect, a method includes receiving, at a server, files related to a job of rendering of a frame, and identifying, based on the received files, a set of resources for executing the job. The method also includes causing the job to be executed on a virtual machine that includes the set of resources identified for the job.

In another aspect, a method includes accessing through a network, processing capacity of virtual machines at a remote location and receiving from users through a network, jobs for rendering frames using applications that have features suitable for rendering frames of the respective jobs. The method also includes causing the applications to run on the virtual machines, and causing each of the jobs to be run on one of the virtual machines. When the job is completed, another job for which that virtual machine is suitable, is caused to be run on that virtual machine.

In another aspect, a method includes recording numbers of uniform units of continuous time that have been reserved by respective customers for use in having instances of virtual machines or applications that are available at a server render frames of jobs submitted by the customers through a network to the server. The method also includes causing jobs of a given customer to be performed during an elapsed one of the uniform units of continuous time that have been bought by the customer. The jobs of the customer that are performed during the elapsed unit of continuous time can require less actual time than the elapsed time of the unit.

In another aspect, a method includes making available to a customer an application or a virtual machine for rendering frames of jobs and permitting the customer to execute two or more instances of the application or virtual machine, respectively. The method also includes receiving from the customer an accurate measure of the amount of elapsed time during a given period when instances of the application or virtual machine were being used for rendering jobs, and recording charges to be paid by the customer based on the measure of the amount of elapsed time. The charges are recorded without regard to the number of instances being used or the calendar period over which the instances were being used.

In another aspect, a system includes a storage device and a computing device connected to the storage device. The computing device includes memory and a processor, and is configured to receive information associated with a job of rendering one or more frames at the server, and use an application to perform at least a portion of the rendering. The use of the application to perform the rendering bears a charge according to a usage license associated with the application. The computing device is also configured to measure an amount of use of the application in performing the rendering for use in determining the charge.

In another aspect, a system includes a storage device and a computing device connected to the storage device. The computing device includes memory and a processor, and is configured to receive files related to a job of rendering of a frame, and identify based on the received files, a set of resources for executing the job. The computing device is also configured to cause the job to be executed on a virtual machine that includes the set of resources identified for the job.

In another aspect, a system includes a storage device and a computing device connected to the storage device. The computing device includes memory and a processor, and is configured to access through a network, processing capacity of virtual machines at a remote location and receive from users through a network, jobs for rendering frames using applications that have features suitable for rendering frames of the respective jobs. The computing device is also configured to cause the applications to run on the virtual machines, and cause each of the jobs to be run on one of the virtual machines. When the job is completed, another job for which that virtual machine is suitable, is caused to be run on that virtual machine.

In another aspect, a system includes a storage device and a computing device connected to the storage device. The computing device includes memory and a processor, and is configured to record numbers of uniform units of continuous time that have been reserved by respective customers for use in having instances of available virtual machines or applications render frames of jobs submitted by the customers through a network. The computing device is also configured to cause jobs of a given customer to be performed during an elapsed one of the uniform units of continuous time that have been bought by the customer. The jobs of the customer that are performed during the elapsed unit of continuous time can require less actual time than the elapsed time of the unit.

In another aspect, a system includes a storage device and a computing device connected to the storage device. The computing device includes memory and a processor, and is configured to make available to a customer an application or a virtual machine for rendering frames of jobs and permitting the customer to execute two or more instances of the application or virtual machine, respectively. The computing device is also configured to receive from the customer an accurate measure of the amount of elapsed time during a given period when instances of the application or virtual machine were being used for rendering jobs, and recording charges to be paid by the customer based on the measure of the amount of elapsed time. The charges are recorded without regard to the number of instances being used or the calendar period over which the instances were being used.

In another aspect, a computer program product includes a computer readable storage device encoded with instructions. Upon execution by one or more processors, the instructions cause operations including receiving, at a server, information associated with a job of rendering one or more frames at the server, and using, at the server, an application to perform at least a portion of the rendering. The use of the application to perform the rendering bears a charge according to a usage license associated with the application. The operations also include measuring, at the server, an amount of use of the application in performing the rendering for use in determining the charge.

In another aspect, a computer program product includes a computer readable storage device encoded with instructions. Upon execution by one or more processors, the instructions cause operations including receiving, at a server, files related to a job of rendering of a frame, and identifying, based on the received files, a set of resources for executing the job. The operations also include causing the job to be executed on a virtual machine that includes the set of resources identified for the job.

In another aspect, a computer program product includes a computer readable storage device encoded with instructions. Upon execution by one or more processors, the instructions cause operations including accessing through a network, processing capacity of virtual machines at a remote location and receiving from users through a network, jobs for rendering frames using applications that have features suitable for rendering frames of the respective jobs. The operations also include causing the applications to run on the virtual machines, and causing each of the jobs to be run on one of the virtual machines. When the job is completed, another job for which that virtual machine is suitable, is caused to be run on that virtual machine.

In another aspect, a computer program product includes a computer readable storage device encoded with instructions. Upon execution by one or more processors, the instructions cause operations including recording numbers of uniform units of continuous time that have been reserved by respective customers for use in having instances of virtual machines or applications that are available at a server render frames of jobs submitted by the customers through a network to the server. The operations also include causing jobs of a given customer to be performed during an elapsed one of the uniform units of continuous time that have been bought by the customer. The jobs of the customer that are performed during the elapsed unit of continuous time can require less actual time than the elapsed time of the unit.

In another aspect, a computer program product includes a computer readable storage device encoded with instructions. Upon execution by one or more processors, the instructions cause operations including making available to a customer an application or a virtual machine for rendering frames of jobs and permitting the customer to execute two or more instances of the application or virtual machine, respectively. The operations also include receiving from the customer an accurate measure of the amount of elapsed time during a given period when instances of the application or virtual machine were being used for rendering jobs, and recording charges to be paid by the customer based on the measure of the amount of elapsed time. The charges are recorded without regard to the number of instances being used or the calendar period over which the instances were being used.

Implementations can include one or more of the following.

The charge can be based on a percentage of revenue generated by the performing of the rendering. The amount of use can be measured as an amount of time. A customer can be charged for the use of the application for rendering the frames in uniform units of use that is different in size from the amount of measured use. The units of use can be regular time periods of no longer than an hour. An availability of the application to be used to perform the rendering, can be determined at the server, based on information representing the usage license associated with the application. Determining the availability of the application can include determining if the application is being used for another rendering job. A determination can be made whether the usage license permits a concurrent use of the application for at least a second rendering job, based on information representing the usage license associated with the application. Information can be maintained about using the application for performing rendering jobs in accordance with the usage license. The use of the application for performing rendering jobs can be regulated in accordance with the usage license. The rendering job can be placed in a queue upon determining that the application is unavailable for use at that time. The measured amount of use can be indicative of how long the application is used for performing the job. The measured amount of use can be provided to a supplier of the application. The information associated with the rendering job can be received from a client application at a remote computing device. The remote computing device can run an image-editing application, and the application at the server can be selected based on the image-editing application. The information associated with the job of rendering can include files and the files can be stored at storage locations local to the server, in accordance with an organization of the files on a remote computing device associated with a remote client application.

A pool of idle virtual machines available to the server can be maintained. The virtual machine can be selected from the pool. Available usage times of the idle virtual machines can be monitored. The virtual machine can be added to the pool upon completion of the execution of the job if the virtual machine has usage time available. One or more resources can be installed on one or more of the idle virtual machines. Execution of at least a part of the job can be completed on at least one other virtual machine if a usage time associated with the virtual machine expires. The other virtual machine can be selected from a pool of idle virtual machines available to the server. At least one resource that is included in the set of resources, can be installed on the virtual machine.

The use of each of the applications can be paid for on the basis of the amount of time that the applications are used for rendering jobs. The users of the application can be charged on the basis of standardized units of time that are no longer than one hour each.

The uniform units can be each shorter than an hour. The uniform units can be each shorter than ten minutes. Each of the customers can be charged for the uniform units of continuous time at a full standard price per unit when the actual amount of time used by the customer during each of the elapsed units of time is less than the uniform units. An instance that is available at the server can be caused to perform jobs of two or more customers during an elapsed period of time that corresponds to the length of each of the uniform units of continuous time. The use of the instance can be paid for on the basis of actual elapsed amounts of time during which the instance is used for the rendering jobs without regard to the uniform units of continuous time for which the customers are charged.

The application or virtual machine can be made available electronically. The accurate measure can include a measure of the minutes during which instances of the application were executing features associated with the rendering of the jobs.

Other features and advantages are apparent from the following detailed description, and from the claims.

BRIEF DESCRIPTION OF THE DRAWINGS

FIGS. 10A-10F show examples of user-interfaces.

DETAILED DESCRIPTION

In some cases, rendering is a process of generating a frame of image or video from a set of attributes (collectively often referred to as a scene file), using suitable computer programs. The attributes can include, for example, geometry, viewpoint, texture, lighting, and shading information, and other descriptors of a virtual scene to be depicted by the frame. The scene can include graphics, images, texts, and other content that is to be processed and assembled in the process of rendering. The data contained in the scene file is passed to a rendering application to be processed based on the attributes and output to a digital image or raster graphics image file. The process of rendering is used, for example, in the creation of visual effects for motion pictures, or in visualization and simulation tasks in building design and architecture. In general, the process of rendering is computationally intensive and requires specialized and expensive hardware. The cloud-based rendering described in this document allows for the rendering process to be outsourced to a cloud computing system, thus reducing the need for expensive hardware to be installed at a user's location. Multiple processors available to the cloud computing system can be used for the rendering process to significantly shorten turn-around time. A client application installed on the user's computing device can be used to facilitate communications with the cloud computing system. By managing various aspects such as data transfers, data security, storage, computing resources, and licensing, the cloud-based rendering described in this document empowers devices with limited computing resources to fulfill their rendering needs. The terms "cloud-based rendering system" or "cloud-based system," as used throughout this document, refers to remote computing resources (hardware and/or software) the use of which can be delivered as a service over a network such as the Internet.

Figure 1A:
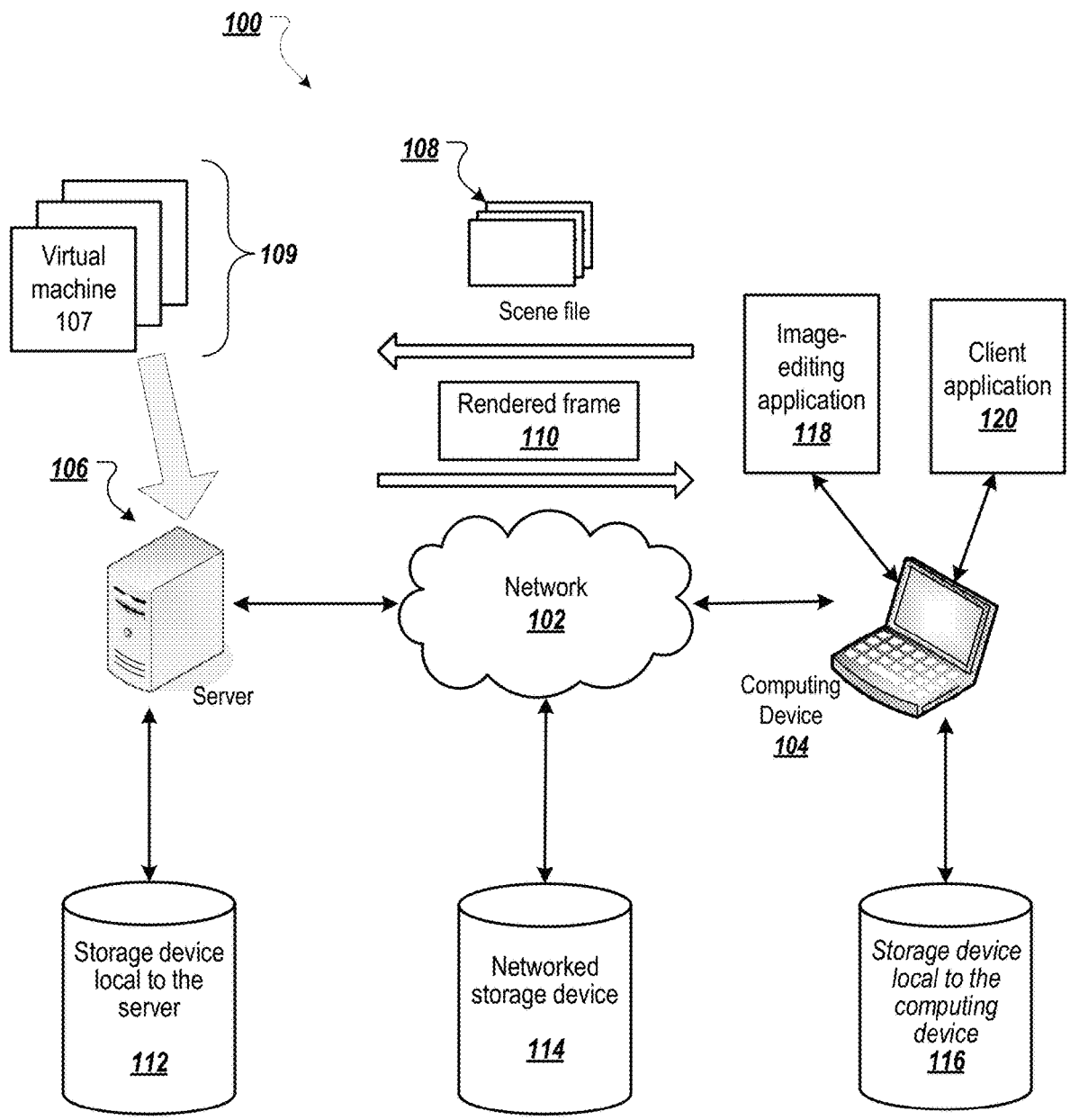
FIG. 1A is an example of a cloud-based rendering system.

FIG. 1A shows an example of a cloud-based rendering system 100. The system 100 includes a computing device 104 communicating with a server 106 over a network 102. As an overview, the computing device 104 sends one or more files related to rendering of a frame over the network 102 to the server 106. The files related to the rendering of the frame can be collectively referred to as a scene file 108. The scene file can include files of various file-types. For example, the scene file 108 can include one or more image or video files (e.g., files with one of the following filename extensions: .tif, .jpg, .png, .rgb, .psd, .mov, .dpx, .cin, or .r3d), one or more data files including information on attributes such as geometry, cameras, etc. (e.g., files with one of the following filename extensions: .abc, .obj, .fbx, or .rib), and one or more files related to an image editing application (e.g., files with one of the following filename extensions: .nk, .ma, .mb, .max, .ae, .c4d, or .hip). The server 106 is a part of a cloud computing system that executes the rendering process based on the scene file 108, and makes a rendered frame 110 available for the computing device 106.

In some implementations, the server 106 can have access to multiple virtual machines 107. A virtual machine 107 can be a set of computing resources (processors, memory, software etc.) that can be used for executing a task from a user or customer. In some implementations different virtual machines 107 can be assigned to execute tasks from a different users or customers. The hardware and/or software associated with the virtual machines 107 can be included as a part of the server 106, or can be provided from a remote location such as another server. In some implementations, the virtual machines 107 can be provided as a service from another cloud-based system. The cloud-based rendering system 100 can be configured to rent, lease or otherwise access the virtual machines 107, from the other cloud-based system. In some implementations, the cloud based rendering system 100 can be configured to maintain a pool 109 of available virtual machines 107.

In some implementations, the rendered frame 110 is made available by being transmitted to the computing device 104. In some embodiments, the server 106 provides a notification to the computing device 104 that the rendered frame 110 is available for download. The server 106 can access a local storage device 112. The computing device 104 can access a corresponding local storage device 116. A local storage device for a given entity (such as a server or a computing device) can be defined as a storage device that is directly connected to the entity, or as a storage device that can be directly accessed by the entity. Entities that are connected over the network 102 can be considered to be remote to one another. Accordingly, the computing device 104 is remote with respect to the server 106 and vice-versa. The system 100 can also include a networked storage 114 that can be accessed over the network 102.

The computing device 104 (which can also be referred to as a client computing device, client device, or simply client) is a device on which a user executes an image-editing application 118 to define a computer generated image or video frame. The computing device 104 can be, for example, a laptop or desktop computer, a mobile device, or a tablet device, or another device capable of executing the image-editing application 118. The image-editing application 118 can include, for example, a computer graphics software package such as Maya®, or 3ds Max®, both developed by Autodesk Inc., a digital compositing software package such as Nuke™ developed by The Foundry Visionmongers Ltd., or another commercially available application that allows for creating or editing computer-generated images and graphics. The image-editing application 118 can be used to define various attributes related to an image or video. For example, the image-editing application can be used to define one or more frames of a length of an animation, an appearance of an image, a size of an image, or an object, text or other content within an image. The appearance of each of the frames to be rendered can be defined or modified using various attributes, such as, shading, texture, shadows, highlights, depth of field, blurs, transparency, reflections, or another attribute that affect how an image appears to a viewer. In some implementations, the image-editing application 118 is executed on the computing device 104. Alternatively, the image-editing application 118 can be provided from a remote server, for example as a web-based service. In some cases, the image-editing application 118 can be accessed through a browser executing on the computing device 104.

In some implementations, the image attributes defined using the image-editing application 118 can be represented using the scene file 108. The scene file 108 can be processed by a rendering application to produce a rendered frame 110, which can be displayed as a visual representation on a suitable display device. Portions of the scene file 108 can be initially stored in a storage device 116 local to the computing device 104. The storage device 116 can include, for example, a hard drive, memory, a removable storage device, or an optical disk that can be accessed by the computing device 104.

In some implementations, the computing device 104 provides the scene file 108 to a cloud computing system represented by the server 106. In general, a cloud computing system allows for the use of remote computing resources (hardware and software) that are delivered as a service over a network. In the present example, the server 106 can include (or communicate with) multiple processors that can work in parallel to expedite the rendering of the frame 110 from the scene file 108.

Figure 10A:
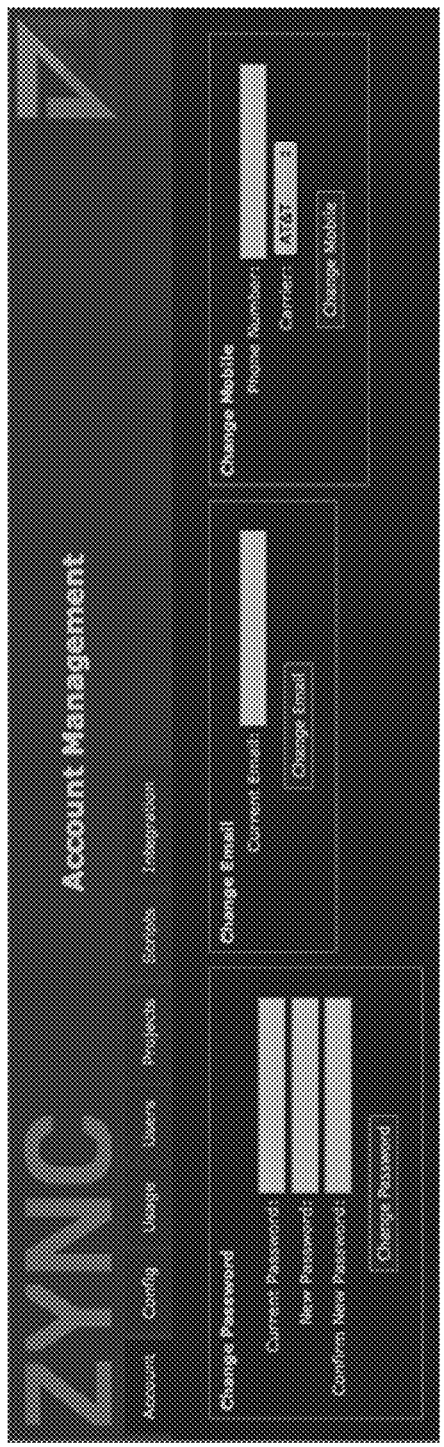

In some implementations, communication between the computing device 104 and the server 106 can be facilitated by a client application 120 executing on the computing device 104. The client application 120 can be invoked, for example, by a control integrated into a user-interface of the image-editing application 118. The control can be integrated into the user-interface of the image-editing application 118 by a plug-in downloaded from a remote source such as a server, onto the computing device 104. In some implementations, at least one of the plug-in or the client application 120 can be invoked by accessing the cloud-computing system server through a browser executing on the computing device 104. In such cases, a user can be asked to set-up an account via a web-based interface to download the plug-in or the client application onto the computing device 104. An example of an account management interface 1000 is depicted in FIG. 10A. The client application 120 can also be an application that executes separately from the image-editing application 118.

Figure 10B:
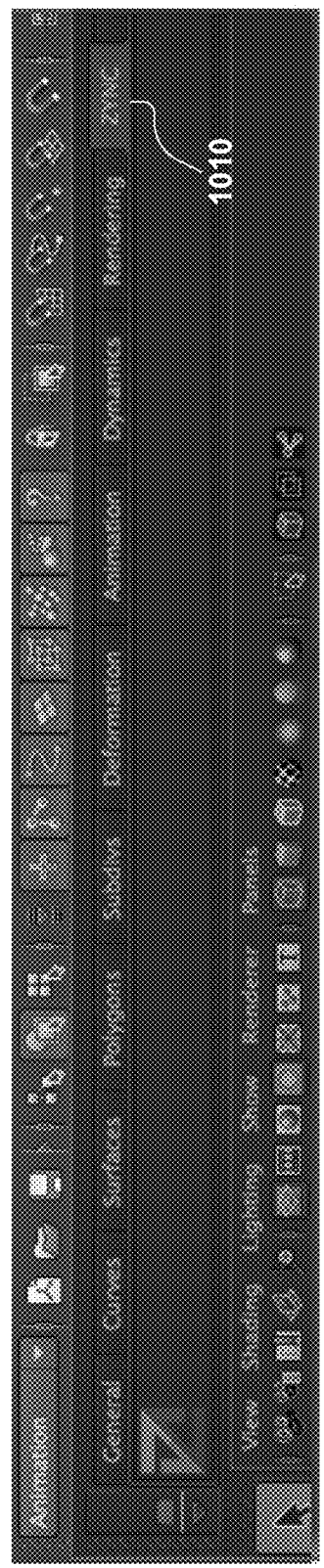
Figure 10C:
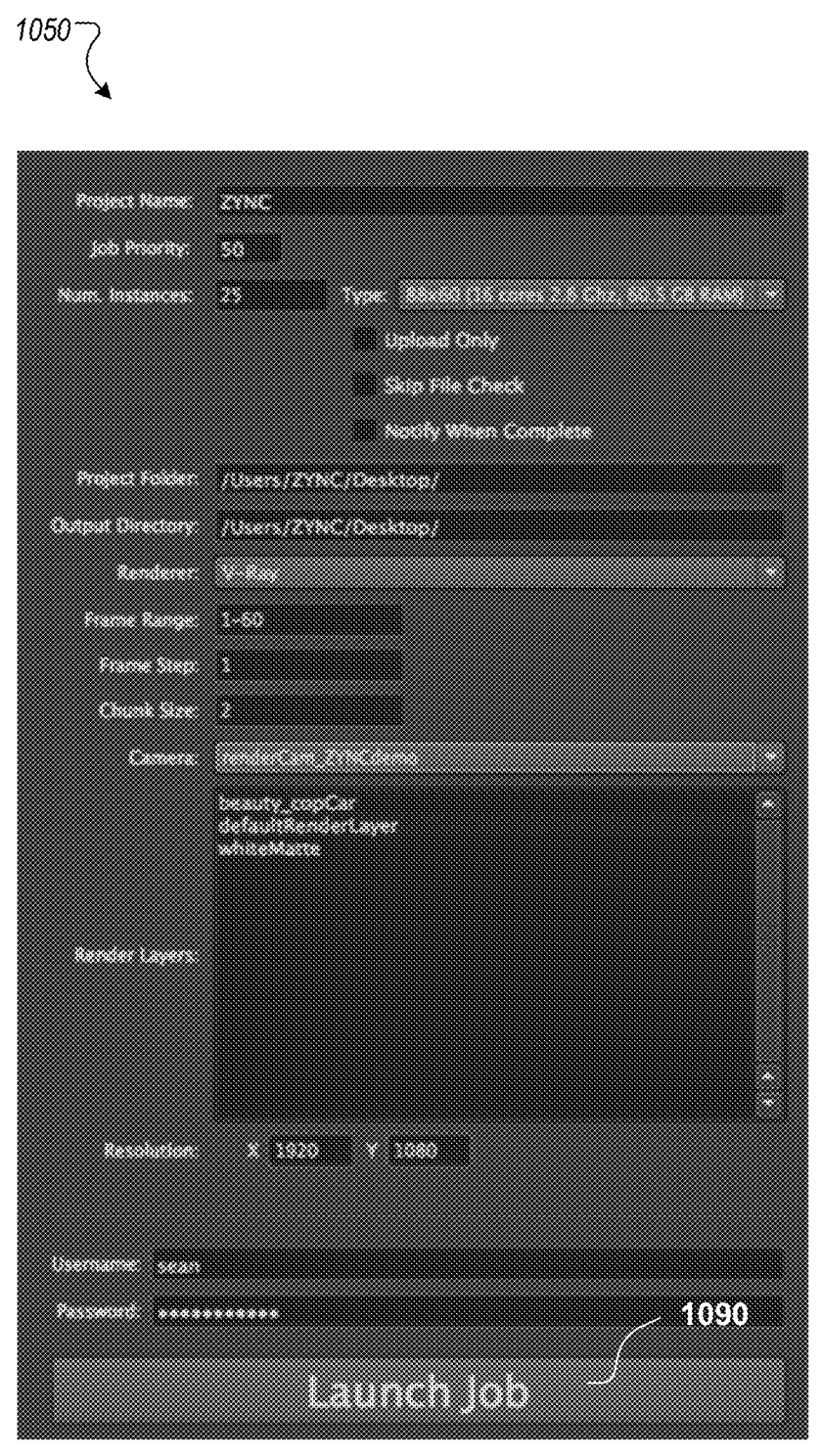
Figure 10D:
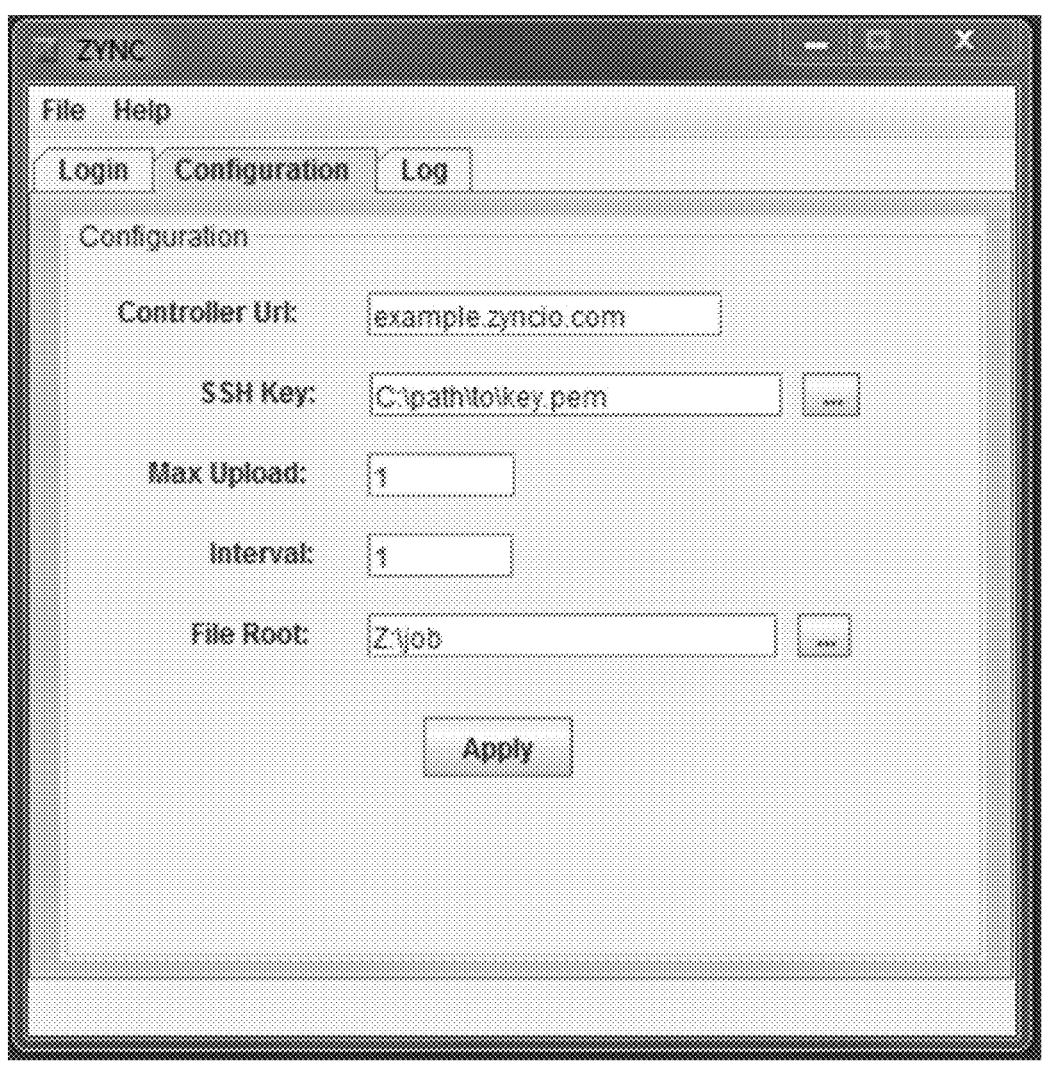

In some implementations, the client application 120 can be configured using a user-interface such as the user-interface 1065 depicted in FIG. 10D. Various aspects and functionalities of the client application 120 can be configured using such the user interface 1065. For example, the user-interface 1065 can be used to provide the client application 120 with the location where a security key is stored. The security key can be provided from the cloud computing system (for example, by an administrator) upon setting up of an account. The security key can determine a level of authorization associated with the user of the account. The security key can also be used by the client application 120 to encrypt and/or decrypt data and files communicated between the computing device 104 and the server 106. In some implementations, the security key can be generated at the server 106 using a cryptographic network protocol such as secure shell (SSH). The user-interface 1065 can also be used to specify other parameters associated with the client application 120, such as, the number of jobs that the client application 120 can simultaneously upload to the server 106, the frequency at which the client application 120 would poll the server 106, and the location of a folder the client application 120 is allowed to access.

In some implementations, the client application 120 manages the communications between the computing device 104 and the server 106. For example, once a user indicates a preference to launch a rendering job (e.g. using the control integrated in the image-editing application 118), the client application 120 facilitates exchanging files and messages between the computing device 104 and the server 106 in order to achieve the completion of the rendering by the server. In some implementations, the client application 120 sends a message to the server 106 that a rendering job needs to be performed. The server 106, in response, can send a request to the client application 120 for the scene file 108 required for the rendering job. The request can be sent, for example, upon determining that enough processors are available to the server 106 to perform the rendering within a threshold time period. If enough processors are not available, or the cloud computing system is unavailable for some other reason (e.g., maintenance), the server 106 can send a message to the client application 120 indicating the unavailability and/or a time the system is expected to be available again.

The client application 120 can manage uploading the scene file 108 from the computing device to the server 106. In some implementations, the scene file 108 is parsed to determine locations of the one or more files associated with the scene file 108 on receiving information that a rendering job is to be uploaded to the server 106. The client application 120 can be configured to verify that the computing device 104 and/or a user of the computing device 104 is authorized/permitted to use the services provided by the cloud computing system through the server 106. Upon the verification, the client application 120 can provide one or more files associated with the scene file 108 to the server 106.

In some implementations, the client application 120 can receive, from the server 106, one or more messages related to the scene file 108 provided to the server 106. For example, the server 106 can request information on modification dates associated with one or more files from the scene file 108. In some implementations, this information is used by the server to determine if a copy of a file from the scene file 108 already exists in the storage device 112 local to the server, and if that copy represents the most updated version of the file. The server 106 can also request one or more additional files based on determining that the one or more additional files is needed for the rendering job requested by the client application 120. In response to the messages from the server 106, the client application can provide the requested information and/or files, if such information or files are available at the computing device 104.

Figure 10E:
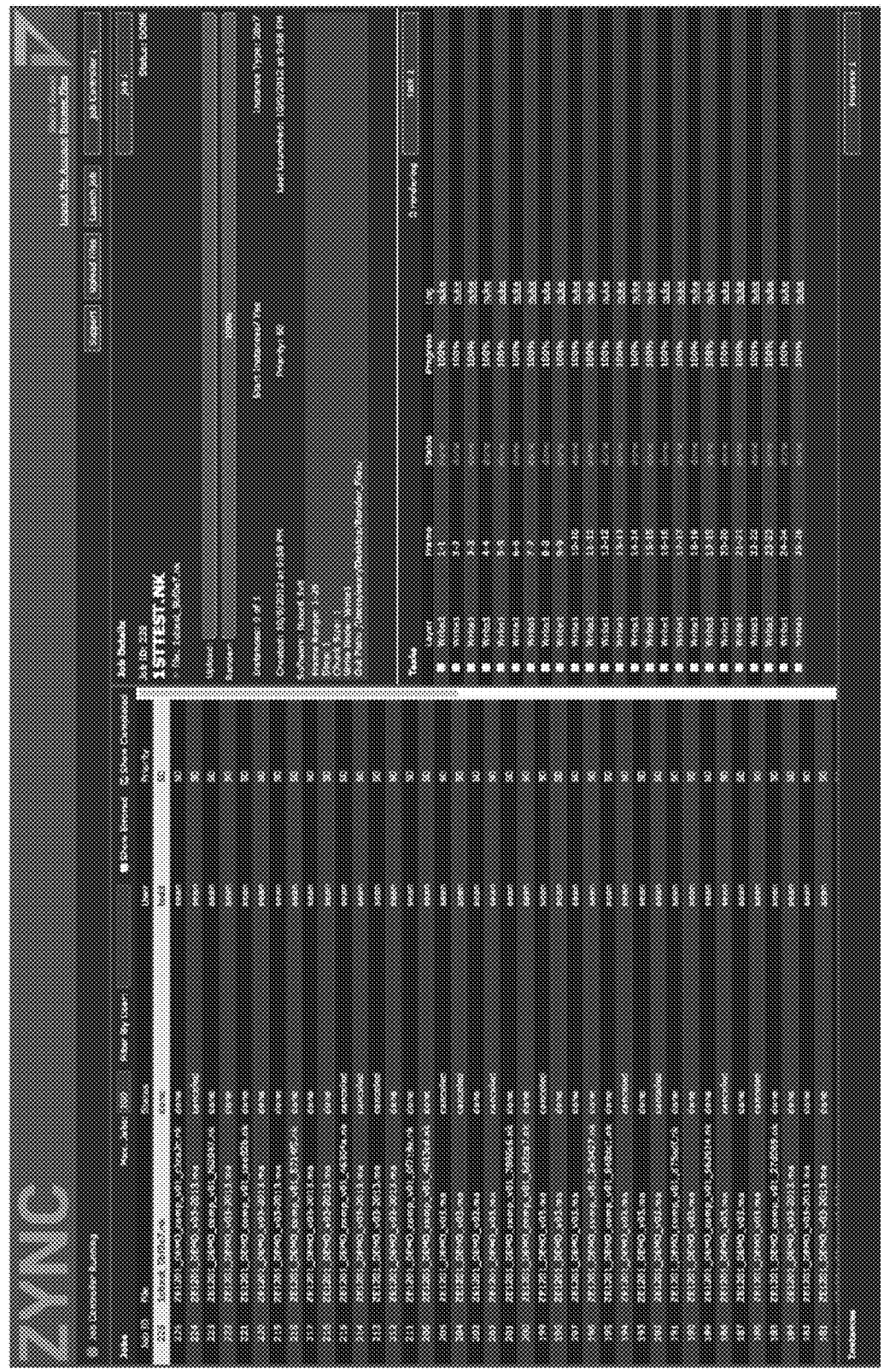

In some implementations, the client application 120 continues to poll the server 106 for a progress report of the rendering job after providing the files and information required for the rendering job. The polling can be done, for example, by periodically sending a message to the server 106 requesting a status update. In some implementations, the server 106 automatically provides, to the client application 120, a periodic status update. The client application 120 can be configured to facilitate display of the status update on the computing device 104, for example, via a user-interface. An example of such an user-interface 1070 is depicted in FIG. 10E. In some implementations, the status update can include information that a rendered frame 110 is ready to be downloaded. Upon receiving such information, the client application 120 downloads the rendered frame 110 on to the computing device 104. The client application 120 can also be configured to communicate with the image-editing application 118 to determine if a rendering job is to be uploaded to the server 106.

The cloud computing system that performs the rendering job is represented by the server 106. The server 106 can include (or communicate with) multiple processors that can process a rendering job under a distributed computing framework. In some implementations, hundreds or thousands of processors can be used, thereby providing subscribers of the cloud computing system with scalable, on-demand computing capabilities. The server 106 can be configured to distribute a given rendering job (as represented by, for example, the scene file 108) to multiple processors and combine the results to produce the rendered frame 110. In some implementations, the server 106 can provide a plug-in to the computing device, wherein the plug-in integrates a control within the image-editing application 118 to communicate with the client application 120. The server 106 can also provide one or more files for installing the client application 120 on the computing device 104.

The server 106 can be configured to manage various aspects related to a rendering job requested by the client application 120. For example, upon receiving a scene file 108, the server 106 can process the scene file 108 to determine if additional files may be needed for the requested rendering job. Depending upon the file-types of the additional files (for example, upon determining that a file is related to a particular software package), the server 106 can either send a request to the client application 120 to provide the additional files, or retrieve the files from another location. In some implementations, if the server 106 determines that the additional files are available at a networked storage device 114, the server 106 may retrieve the additional files directly from the networked storage device 114. For example, if a required additional file is determined to be related to a particular software package, the server can be configured to contact a central repository associated with the software package to directly retrieve the required additional file.

In some implementations, the server 106 can be configured to determine if a version of an additional required file exists on the local storage device 112. Upon such determination, the server 106 may send a message to the client application requesting information if the file has been modified at the computing device 104 since the last upload. The server 106 may only request the file from the computing device if the file has been modified since the last upload, else, the server can use the version of the file available from the local storage device 112.

Upon receiving the files required for the rendering job, the server 106 can begin the rendering process. In some implementations, the server 106 selects an appropriate rendering application for the rendering job based on the files and information provided by the client application 120. The rendering application can be selected, for example, based on the image-editing application 118. The selected rendering application can be executed by the server, and possibly by the multiple processors participating in the rendering process, to produce the rendered frame 110 from the files and information received from the client application 120 or retrieved by the server 106.

In some implementations, the server 106 can be configured to manage licensing and usage-tracking with respect to the selected rendering application. For example, for a rendering application selected for a given rendering job, the server 106 may track an associated usage-parameter (for example, total usage time or job size), receive billing details from a vendor of the selected rendering application and provide an invoice for the usage. In some implementations, the server 106 can be configured to maintain logs that reflect the usage details. By managing licensing and usage-tracking, the server 106 prevents unauthorized use of the rendering application while relieving the end-user (i.e. the user of the computing device 104) from the burden. Further, multiple rendering applications can be made available for use with files from various sources and image-editing applications.

In some implementations, the files received from the client application 120 are stored on the local storage device 112 based on file-types identified for the received files. For example, if a given received file is related to a particular software package, the server 106 can be configured to store the given file within a folder reserved for storing files for the particular software package. In some implementations, if a received file is identified as a script file, the server 106 scans the script file for occurrences of file-paths identifying storage locations specific to the storage device 116 local to the computing device 104. The file-paths can then be automatically replaced by the server 106 with revised file-paths identifying storage locations specific to the local storage device 112. The files associated with the corresponding revised file-paths are then stored at storage locations specified by the revised file-paths. In this way, the server 106 organizes the files received from the computing device 104 on the local storage device 112 in a systematic fashion. In some implementations, the organization of the received files within the local storage device 112 includes mirroring the organization of the corresponding files on the storage device 116 local to the computing device 116.

During the rendering process, the server 106 can provide periodic updates on the process to the client application 120. For example, if the rendering job involves rendering multiple frames, the updates can include providing a preview (e.g. a thumbnail image) of each rendered frame as they are produced. In some implementations, once a rendered frame 110 is produced, the server 106 makes the rendered frame 110 available for the client application 120 to download on the computing device 104. The server 106 can also store a copy of the rendered frame 110 on the local storage device 112. This way, if a user needs to download the rendered frame 110 again (e.g. on a different computing device), the user can do so without having to execute the rendering process again. The server 106 can also retain the scene file 108 and one or more additional files related to the completed rendering job (possibly tied to a user account) such that at least some of the files need not be uploaded again for executing a similar rendering process.

Figure 1B:
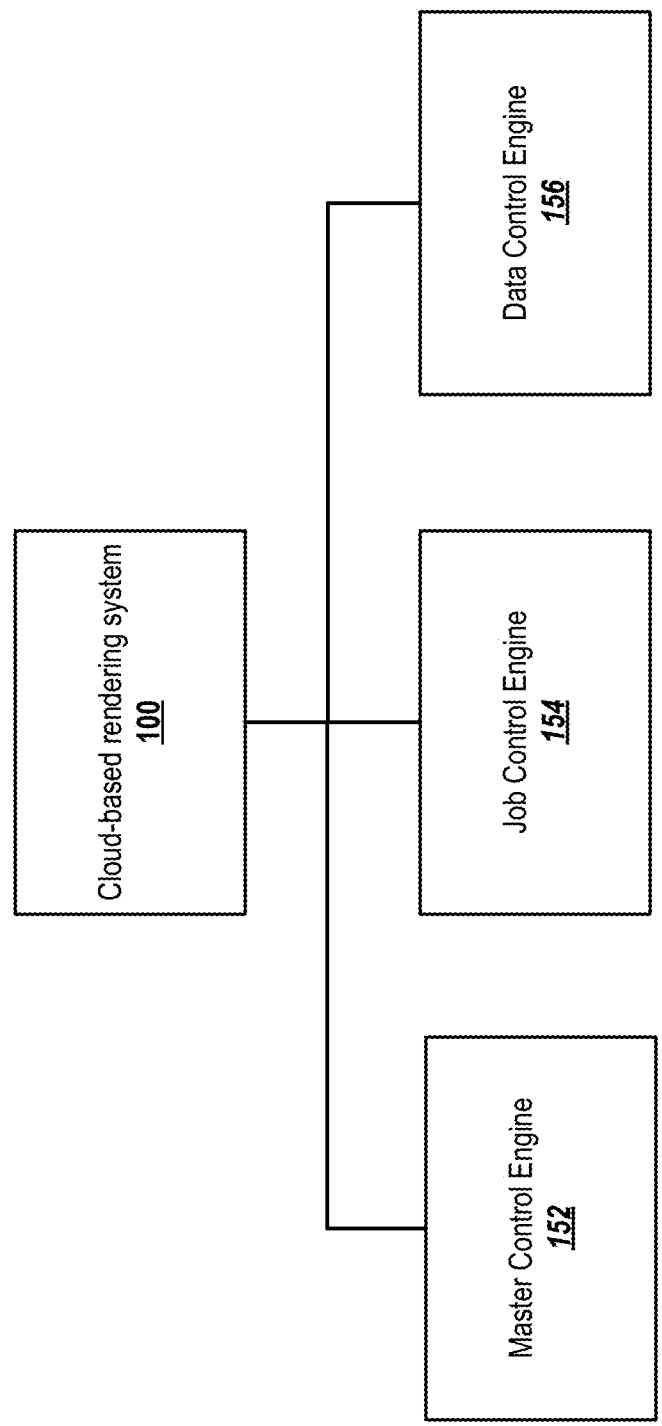
FIG. 1B shows examples of component systems of a cloud-based rendering system.

The cloud-based rendering system 100 can include multiple sub-systems or components. FIG. 1B shows a block diagram that illustrates examples of such component systems of the cloud-based rendering system 100. In this example, the component systems include a master control engine 152, a job control engine 154, and a data control engine 156. In some implementations, these systems can be substantially autonomous, while working in conjunction with one another to provide one or more functionalities described in this document. The different sub-systems, viz., the master control engine 152, the job control engine 154, and the data control engine 156 can be implemented as a combination of software and/or hardware modules. Functionally, the various tasks performed by the cloud-based rendering system 100 can be divided among these sub-systems. However, the sub-systems need not be implemented as physically separate entities. For example, in some cases, functions of one or more of the master control engine 152, the job control engine 154, and the data control engine 156 can be performed at the server 106 by a common processor (or set of processors).

The data control engine 156 can be configured to handle security and storage of user data, for example, as describes above. In some implementations, the data control engine 156 manages encryption and storage of user data in storage locations local to the server 106. Segmentation and organization of data can also be performed by the data control engine 156.

Functionalities of the job control engine 154 can include, for example, managing active rendering tasks being executed by the cloud-based rendering system 100. For example, the job control engine 154 can be configured to perform load balancing between the multiple processors, and/or other resources available to the cloud-based rendering system 100. The job control engine 154 can also be configured to communicate with the client application 120, for example, to receive new tasks from users and notify the client application when a rendered frame is ready for download.

The master control engine 152 can be configured to manage a high volume of tasks that may be received from various end-users. The master control engine 152 can check, for example, the credentials of a user to ensure that the user is authorized to use the services of the cloud-based rendering system 100. The master control can also be configured to manage assignment of tasks to cloud-based virtual machines 107 available to execute the tasks.

The use of the virtual machines 107 or applications can be referred to as instances. In some implementations, instances of virtual machines 107 can run on physical processors of a cloud-based system. In some implementations, an instance of an application can run on a virtual machine 107. Multiple instances of an application can run on a single virtual machine instance. Multiple instances of the application can also run across multiple instances of the virtual machine 107.

In some implementations, a virtual machine 107 is a set of computing resources (processors, memory, software etc.) that can be used for executing a task from a user. For example, if a cloud-based computing system includes resources such as many processors, a large amount of memory, and a large amount of storage space, a portion of the resources (e.g. a few processors, a few gigabytes of memory, and a few gigabytes of storage space) can be allocated as a virtual machine 107 that can function substantially independently from the rest of the cloud computing system. In some implementations, the cloud-based rendering system 100 can include the resources used in creating virtual machines 107. In some implementations, the cloud-based rendering system 100 may lease or buy virtual machines 107 from a vendor. The master control engine 152 can be configured to manage virtual machines 107 available to the cloud-based rendering system 100. Managing a pool of instances of virtual machines or applications is often referred to as instance pooling, and is discussed below in more details.

The various sub-systems described above can work in conjunction with one another to provide the rendering services described in this document. In some implementations, once a request for a task is received from a user, the master control engine 152 can select a virtual machine 107 from a pool 109 of virtual machines (if available) and authorizes a launch of the virtual machine 107. The cloud-based rendering system 100 can be configured such that the existence of the virtual machines 107 is transparent to the user. The user can simply request rendering services (e.g., in the form of a task) and receive a corresponding end-product.

If a suitable virtual machine 107 is not available in the pool 109, the master control engine 152 can facilitate leasing or creating of a virtual machine 107 in accordance with the request from the user. Once the virtual machine 107 is created or launched, the job control engine 154 can assign the virtual machine 107 to a task or job from the user. Once the virtual machine 107 completes the task, the job control engine 154 can be configured to search for a next task from the same user. If multiple tasks from the same user are available, the job control engine 154 can be configured to select one of the available tasks, for example, based on priority information associated with the task.

In some implementations, the master control engine 152 can maintain and launch several virtual machines 107 that are available for use by customers to execute a rendering process using one or more rendering applications (such as Maya®) running on one or more operating systems (such as Linux). The rendering application and operating system can be installed on a virtual machine 107 prior to the launch. Alternatively, a virtual machine 107 that has the requisite application and operating system pre-installed can be selected from a pool 109 of available virtual machines 107.

In some implementations, virtual machines 107 can be provided to a customer in bundles of a predetermined time period (e.g. an hour or fifteen minutes of virtual machine time). However, the customer may end up not using the entire time period. For example, a customer may be allotted one hour of usage-time for an initial task on a virtual machine 107, but end up actually using only twenty-five minutes of the one hour for the initial task. In such a case, thirty-five minutes of additional usage-time remains on the virtual machine. In some cases, the customer can execute more jobs/tasks and use up the remaining thirty-five minutes, without incurring any additional cost. Alternatively the customer may not need the additional thirty-five minutes. In such cases, the master control engine 152 can be configured to release the virtual machine 107 (with thirty-five minutes of remaining usage-time) to a pool 109 of virtual machines 107 maintained by the cloud-based rendering system, such that the remaining usage-time of the virtual machine 107 can be used by a job or task from another user. The master control engine 152 is configured to ensure that sensitive user-specific files and information are protected appropriately when a virtual machine 107 is transferred to the pool 109. For example, all user-specific data can be deleted from the virtual machine 107 prior to being released to the pool 109. Alternatively, the user-specific data can be stored securely such that a different customer would not be able to access the data. In case the original customer needs to use the virtual machine 107 again, the securely stored, relevant user-specific data can be retrieved, for example, upon verifying credentials of the original customer.

In some implementations, the master control engine 152 checks for virtual machines 107 available in the pool 109 before launching a new virtual machine 107. For example, if another customer requests the use of a virtual machine 107 for an hour, the master control engine 152 first checks if a suitable virtual machine 107 (e.g. the virtual machine with thirty-five minutes of available usage-time from the previous example) is available in the pool 109. If no suitable virtual machines 107 are available, the master control engine launches a new virtual machine 107 for the customer. For example, if none of the virtual machines 107 available in the pool 109 has the amount of memory requested by the new customer, or none of the available virtual machines 107 has enough remaining-usage time for a task from the new customer, the master control engine 152 may create or lease an appropriate new virtual machine 107.

In some implementations, selecting a virtual machine 107 from the pool 109 can be based on the resources required for a given task. For example, if a new customer requests a rendering job using Maya® running on Linux, the master control 152 can be configured to search for an existing virtual machine 107 on which the requisite resources are installed. If an exact match is not available, the master control engine 152 can be configured to select a close match (e.g. a virtual machine that runs on Linux, but does not have Maya®), and install the remaining requisite resources (in this case, Maya®). In some cases, the master control engine 152 may need to install several resources on a virtual machine 107 to make the machine usable for a new customer.

In some implementations, the master control engine 152 can be configured to automatically install additional resources on a virtual machine 107 when the virtual machine 107 is sitting idle in the pool 109. Therefore, an available virtual machine 107 can be progressively made more generic (by installing more and more resources that may be needed by a new customer) as the virtual machine 107 sits idle in the pool 109. In general, having the resources pre-installed on a virtual machine 107 can potentially reduce a time needed to launch the virtual machine 107 for a new customer.

Referring back to the example of using the virtual machine 107 with thirty-five minutes of remaining usage time, a new customer assigned to the virtual machine 107 may need additional time over the thirty-five minutes. In that case, the master control engine 152, either upon expiration of the thirty-five minutes or preemptively, can renew the lease for that virtual machine 107 for the next bundle of predetermined time period. In some implementations, the master control engine 152 can be configured to transition the task to another suitable virtual machine 107 available in the pool 109. In general, using idle virtual machines as described in this document, allows for more efficient use of already created virtual machines and saves on time needed to launch a new virtual machine 107 each time a customer requests one. The management of virtual machines 107 by the master control engine 152 can be done in a way such that the experience of an end user or customer is not affected by such management. In some implementations, the master control engine 152 can be configured to maintain a buffer number of additional virtual machines in the pool 109 such that a time delay to launch a virtual machine 107 can be reduced. Pre-installing as many resources as possible on the virtual machines 107 in a preemptive fashion also helps in reducing the time delay.

Figure 10F:
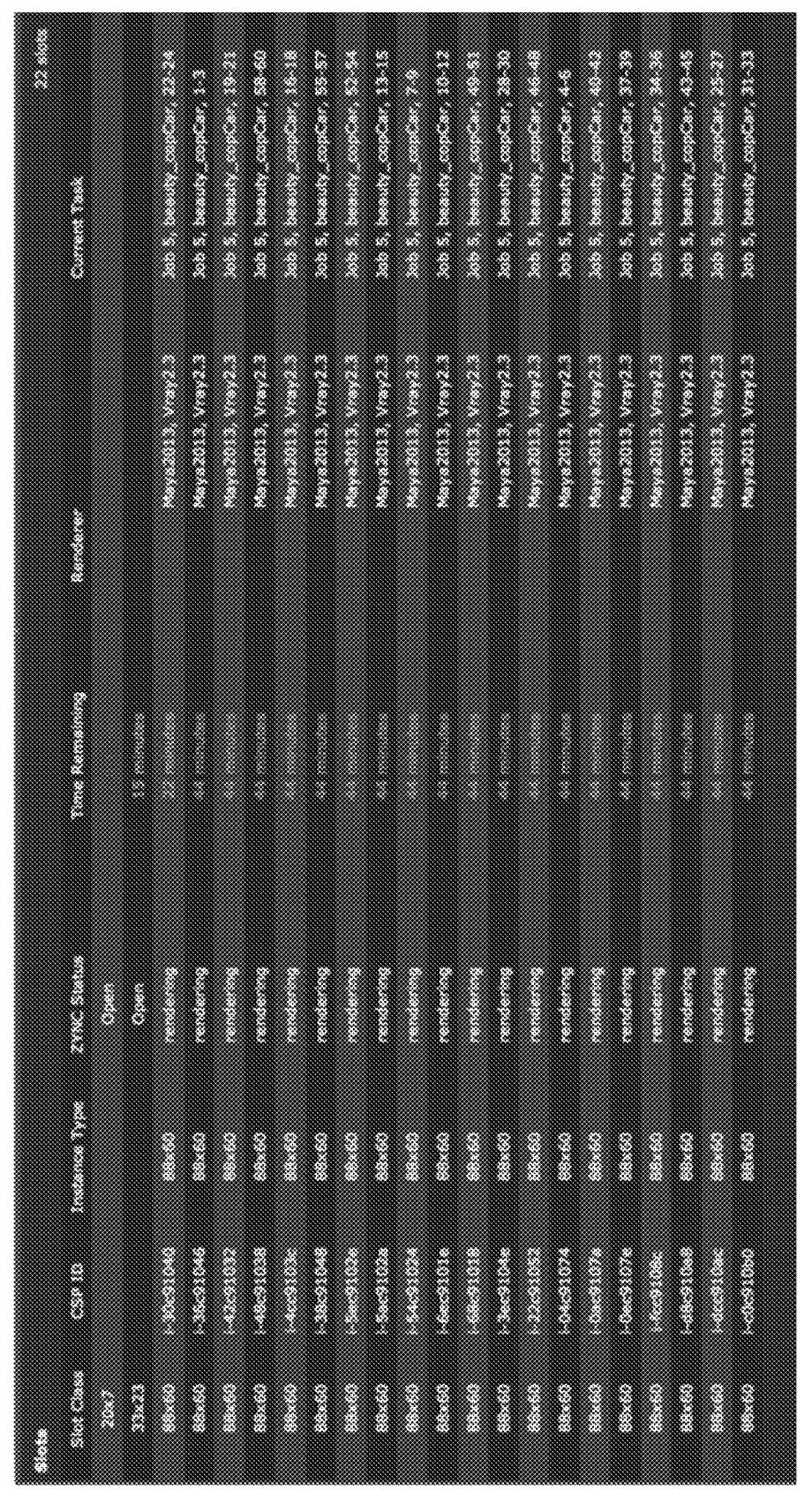

In some implementations, the master control engine 152 can be configured to display the pool 109 of available virtual machines 107 using a user interface on a display device. An example of such a user interface is shown in FIG. 10F. The example interface shown in FIG. 10F includes various parameters related to the available virtual machines 107, along with indications of available usage-times. In some implementations, the display of the virtual machines can be color coded in accordance with the amount of remaining usage-time. For example, virtual machines with more than thirty minutes of remaining usage-time can be displayed in blue, virtual machines with less than ten minutes of available usage-time can be displayed in red, and virtual machines having remaining usage-time between ten and thirty minutes can be displayed in orange. The master control engine 152 can also be configured to perform statistics logging related to the tasks executed by the virtual machines 107. For example, the master control engine 152 can be configured to track what resources are being used for various tasks, and how much time each task takes. The master control engine 152 can also be configured to monitor other parts of the cloud-based rendering system 100 to ensure that various components and sub-systems are functioning normally. The master control engine 152 can also be configured to manage licenses for resources that are used for rendering the tasks. For example, the master control engine 152 can be configured to track usage of licensed resources, for example, to support revenue sharing with corresponding licensing entities. This functionality of the master control engine 152 can be referred to as license tracking.

In some implementations, when a rendering request is received from the client application 120, the cloud-based rendering system 100 can determine that third party resources such as applications, plugins, shader languages, or other software, may be needed to perform the rendering operations. The master control engine 152 can be configured to manage usage-licenses of such resources from appropriate licensing entities. For example, the master control engine 152 can be configured to track when a usage-license is checked out, used by a virtual machine 107, and checked back in upon completion of a task by the virtual machine 107. In some implementations, the master control engine 152 can be configured to check if a license is available and allow a license to be checked out only if an appropriate license is available. The master control engine 152 can also be configured to ensure that the resources are used in accordance with the licensing terms and agreement.

In some implementations, the master control engine 152 maintains a queue of tasks that are waiting on a licensed resource, until a suitable license becomes available. The master control engine can also be configured to manage assignment of the licenses to virtual machines 107 as the licenses become available. In some implementations, the master control engine 152 is configured to track usage-times of licensed resources across various virtual machines 107 at various levels of granularity. For example, the master control engine 152 may track licensing for multiple applications and plugins per task and per job. In some implementations, in the event a task or job fails to be completed, the master control engine 152 may track the license usage accurately up to the point of failure such that an actual amount of usage can be logged. Such accurate tracking of usage-times can allow for accurately and fairly compensating a licensing entity, if the task is not completed for a reason beyond the control of the licensing entity. Even though the license management described in this document is illustrated specifically in the context of a cloud-based rendering system 100, such license management can also be used in other systems where various resources are licensed from licensing entities.

Using the instance pooling and/or the license management described above, either separately, or in conjunction with one another provides several advantages. In some existing systems, a service provider can buy multiple licenses for using licensed packages such as Maya®. Typically, the licensing entities charge the service provider based on the number of projects, requiring the service provider to buy a new license for each new project. However, when the usage of the licenses is not accurately tracked, a dishonest service provider can violate licensing agreements by reselling or leasing use of the packages. Using the virtual machine pools and license tracking, as described above, allows for expanding the revenue-generating capacity of cloud-based computing resources and licensed packages, while allowing for transparent audits. In some implementations, a licensing entity can be compensated (for example on a revenue sharing basis) for the actual amount of usage of the licensed resource (rather than on a per project basis). This can result in, for example, more revenue for the licensing entity because the licensed resource is efficiently used for the intended purpose and the usage is accurately tracked.

Figure 2:
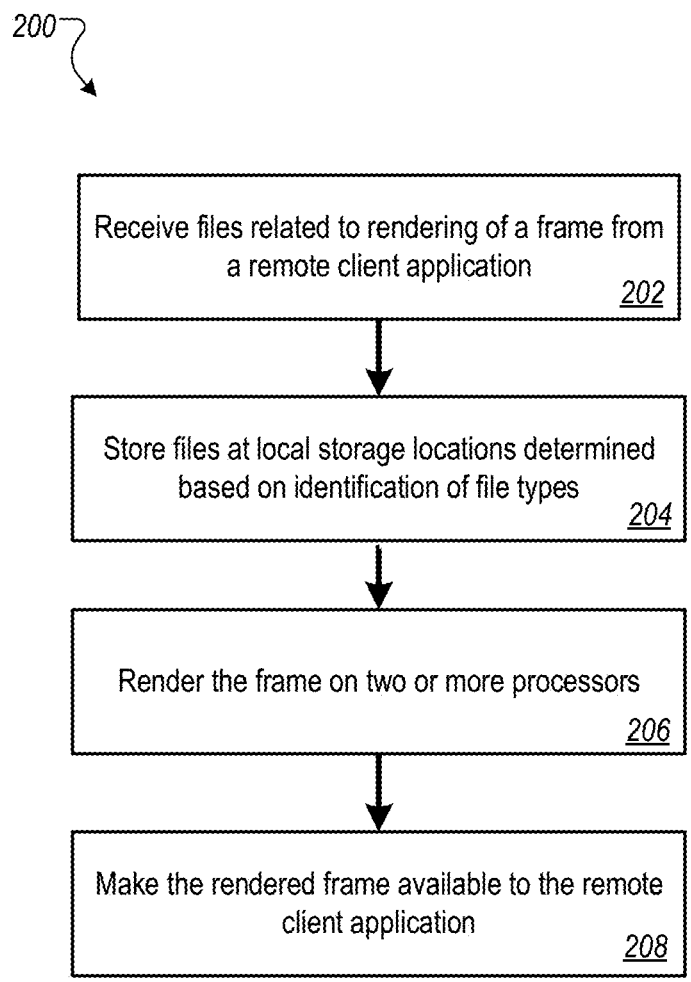
FIG. 2 is a flowchart depicting an example sequence of operations for rendering a frame.

FIG. 2 shows a flowchart 200 depicting an example sequence of operations for rendering a frame. The sequence of operations depicted by the flowchart 200 can be performed on a device such as the server 106 described with respect to FIG. 1A. The operations include receiving files related to rendering of a frame from a remote client application (202). The remote client application can be executed on a computing device (e.g. the computing device 104 described with reference to FIG. 1A). The received files can include a scene file having information on various attributes and objects that are to be used in the rendering of the frame.

Operations can include storing the received files at local storage locations determined based on identifying file-types for the received files (204). For example, if a received file is identified to be of a particular file-type, the particular received file can be stored at a particular location. The particular location can be determined, for example, in accordance with a storage location of the corresponding file at a remote storage location. If a received file is identified as a script file, the file can be scanned to identify occurrences of textual representation of file-paths related to one or more additional files. In such cases, the additional files can be stored in accordance with the textual representations of the file-paths. In some implementations, where the textual representations are specific to remote storage locations, the representations are replaced by revised textual representations of file-paths specific to local storage locations, and the additional files are stored in accordance with the revised textual representations.

Operations also include rendering the frame on two or more processors (206). For example, the process of rendering the frame can be distributed over multiple processors for parallel execution under a distributed computing framework. In some implementations, when multiple rendering jobs are to be executed, distributing the jobs can be done based on priority information associated with the jobs. For example, when only a limited amount of computing resources are available, a high priority job may be processed before a lower priority job, even if the lower priority job is received earlier. The computation results from the multiple processors can be combined to produce the rendered frame.

Operations also include making the rendered frame available to the remote client application (208). This can include, for example, storing the rendered frame at a storage location that the remote client application can access to download the rendered frame. In some implementations, when a rendered frame is made available, a message can be sent to the remote client with a notification that the rendered frame is available for download.

Figure 3:
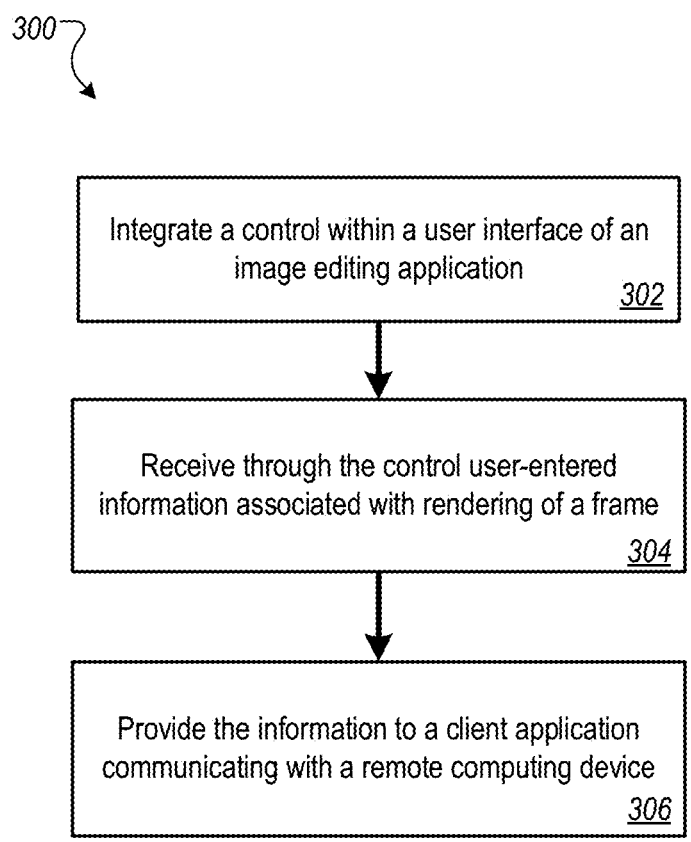
FIG. 3 is a flowchart depicting an example sequence of operations for interfacing between an image-editing application and a client application.

FIG. 3 shows a flowchart 300 depicting an example sequence of operations for interfacing between an image-editing application and a client application. The sequence of operations depicted by the flowchart 300 can be performed, for example, at the computing device 104 described with reference to FIG. 1A. The image-editing application and the client applications can be substantially similar to the applications 118 and 120, respectively, described with reference to FIG. 1A.

Operations can include integrating a control within a user-interface of an image-editing application (302). The control can be integrated, for example, using a plug-in for the image-editing application. The plug-in can be downloaded and installed for the control to be integrated within the user-interface of the image-editing application. The control can include, for example, a virtual button, a checkbox, a tab, or another graphical representation. The control may be selectable using a mouse-click, or by touching a relevant portion of a touch-screen display. In some implementations, the control may not be visible on a user-interface but can be invoked as needed, for example, using an appropriate script-based command. An example of the control is depicted in the user-interface shown in FIG. 10B. In this particular example, the control 1010 appears as a separate tab within the user-interface 1005 and is similar to other controls within the user-interface 1005. In some implementations, a control for activating the client application can also be integrated with a graphics pipeline management tool or production tracking software package such as Shotgun®, developed by Shotgun Software Inc.

Operations include receiving through the control user-entered information associated with the rendering of a frame (304). Referring again to the example of FIG. 10B, a user can select the control like any other control within the user-interface 1000 to begin the rendering. In some implementations, selecting the control brings up another user-interface through which additional information related to the rendering can be entered by the user. An example of such a user-interface is shown in FIG. 10C. The user-interface 1050 depicted in the example of FIG. 10C allows the user to provide details, such as, a location of the files related to the rendering, a name of the rendering project or job, a priority associated with a rendering job, a range of frames (e.g. a length of a shot being rendered), frame steps (e.g. whether every frame, or every second frame, or every third frame is to be rendered), layers to be included in a rendering job, location of an output directory, desired resolution, a user-name and password associated with an account, and other parameters and attributes associated with the rendering. After entering the information, the user can select a control (such as the control 1090) to launch the rendering job.

Operations also include providing the information to a client application communicating with a remote computing device (306). The remote computing device renders the frame based on files provided by the client application. In some implementations, if the client information is not executing, operations can also include launching the client application such that the information can be provided to the client application.

Figure 4:
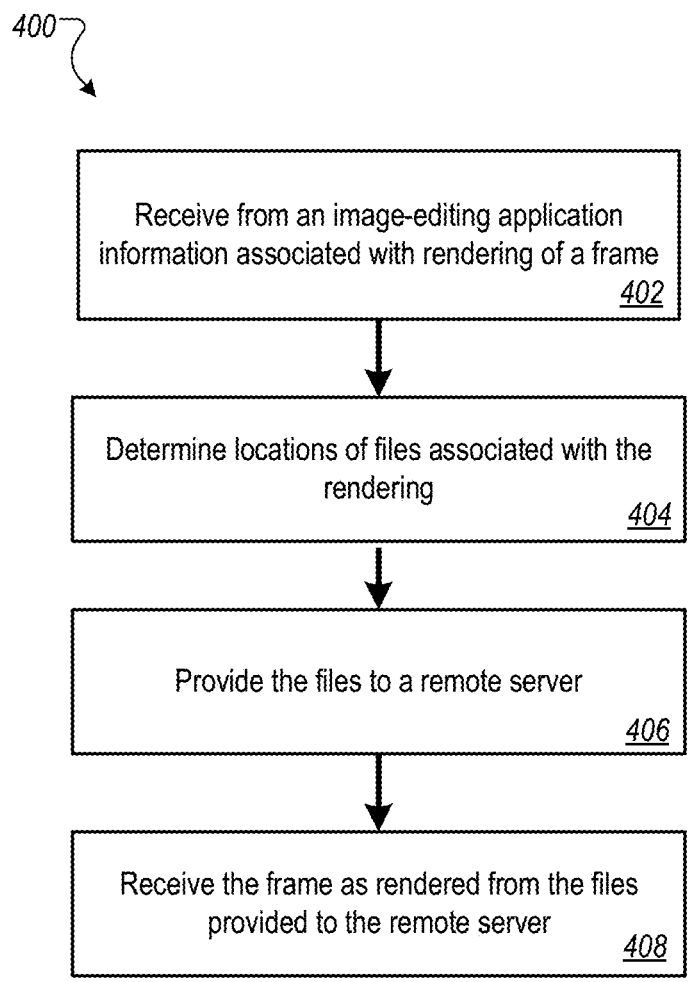
FIG. 4 is a flowchart depicting an example sequence of operations for communicating with a remote server to render a frame.

FIG. 4 shows a flowchart 400 depicting an example sequence of operations for communicating with a remote server to render a frame. The sequence of operations depicted in the flowchart 400 can be performed, for example, by the client application described with reference to FIG. 1A. Operations include receiving from an image-editing application, information associated with rendering of a frame (402). The information from the image-editing application can be received, for example, when a user activates or selects a control integrated within a user-interface of the image-editing application. The information can include for example, an indication that a rendering job is to be launched, location of one or more files and/or folders related to the rendering job, an output directory where the rendered frame is to be saved, and one or more attributes related to the rendering job.

Operations also include determining locations of files associated with the rendering (404). The determination can be made, for example, based on information provided by the user. One or more of the files can then be retrieved from the determined location for forwarding to a remote server.

Operations also include providing the files to the remote server (406). In some implementations, copies of the files are uploaded to a location accessible by the remote server. Metadata information related to the files can also be provided. The metadata information of a file can include, for example, a file-type, location information, and file size. In some implementations, a file is provided to the remote server based on determining that the remote server is requesting the file.

Operations also include receiving the frame as rendered from the files provided to the remote server (408). In some implementations, when the rendering involves multiple frames, the frames can be received sequentially as and when they are produced. Alternatively, multiple frames can be received together. Receiving the frame can include receiving a notification that a rendered frame is available for downloading. A particular remote location can then be accessed to download the rendered frame.

Figure 5:
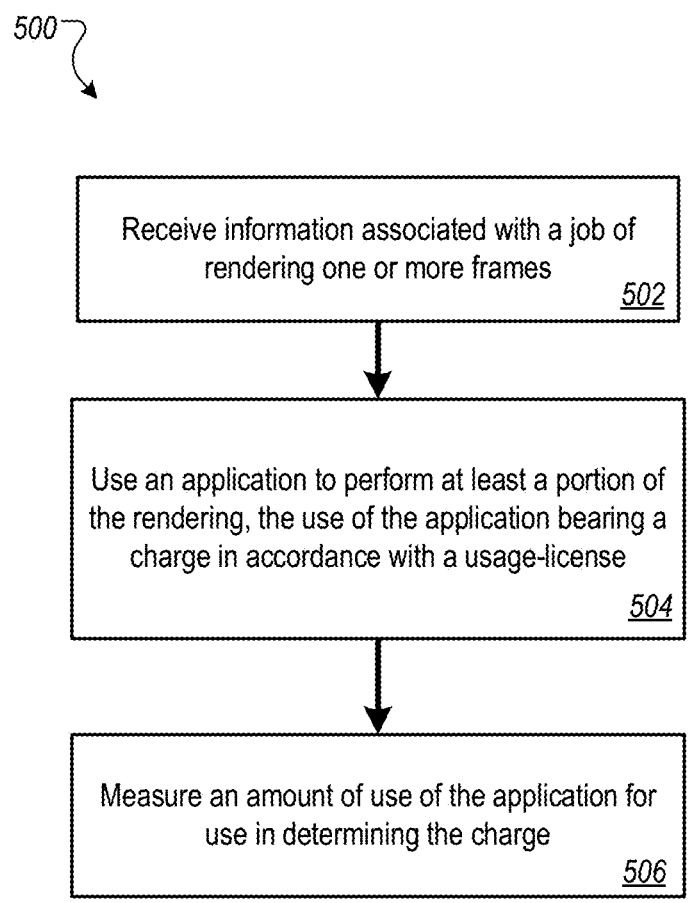
FIG. 5 is a flowchart depicting an example sequence of operations for determining a charge for using an application.

FIG. 5 shows a flowchart 500 depicting an example sequence of operations for determining a charge for using an application. The operations depicted in the flowchart 500 can be performed, for example, at the server 106 described with reference to FIG. 1. The operations can include receiving information associated with a job of rendering one or more frames (502). The information can be received from, for example, a client application executing on a remote computing device that runs an image editing application.

The operations can include using an application to perform at least a portion of the rendering, the use of the application bearing a charge in accordance with a user license (504). The application can be selected, for example, based on identifying the image editing application at the server. The image editing application can be identified, for example, based on a scene file included in the information. The charge can be based on, for example, a percentage of revenue generated by the performing of the rendering. An availability of the application can be determined, for example, based on information representing the usage license associated with the application. For example, if the usage license allows for up to ten concurrent uses of the application, the application can be deemed unavailable if the application is already being used on ten separate virtual machines. Under the same license terms, the application can be deemed available, if being used on less than ten virtual machines. Accordingly, determining the availability of the application can include determining if the application is being used on another virtual machine for another rendering job. This can be done, for example, based on a record of usage information of the application maintained at the server. If an determination is made that an application is currently unavailable, the job requiring a use of the application can be placed in a queue until the application becomes available again.

The operations can also include measuring an amount of use of the application for use in determining the charge (506). The amount of use can be measured, for example, as an amount of time. In some implementations, a customer can be charged for the use of the application for rendering the frames in uniform units of use that may be different in size from the amount of measured use. For example, a customer may be charged for a minimum predetermined time (e.g. an hour, or thirty minutes) even if the amount of use is determined to be less than the predetermined time. In some implementations, the measured amount of use can be indicative of how long the application is used for performing the job. The measured amount of use can be provided to supplier of the application. For example, in a scenario where the supplier is compensated based on an actual amount of use (e.g., on a revenue-sharing basis), the measured amount of use can be used to determine the charges due to the supplier.

Figure 6:
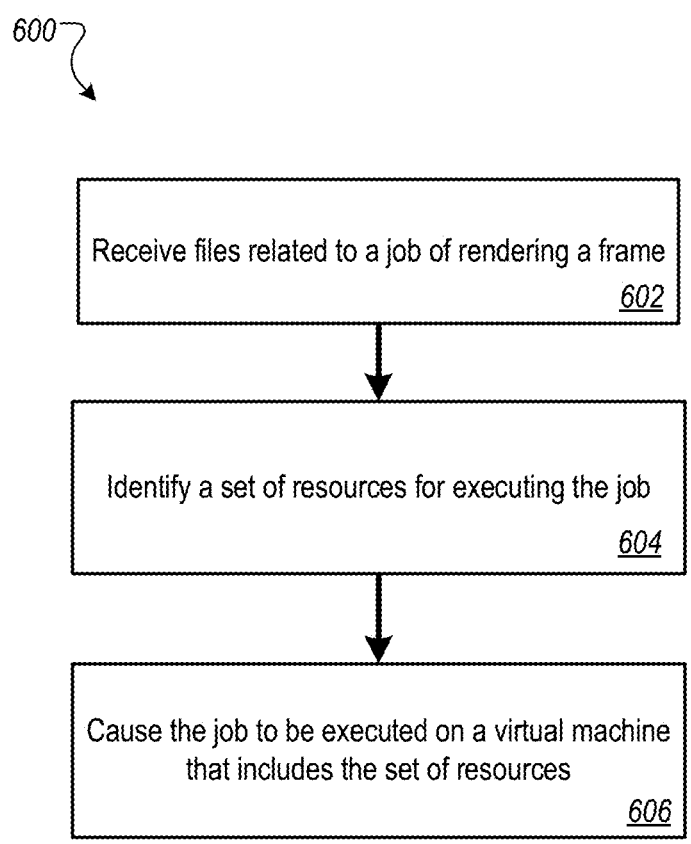
FIG. 6 is a flowchart depicting an example sequence of operations for managing virtual machines.

FIG. 6 shows a flowchart 600 depicting an example sequence of operations for managing virtual machines. The operations depicted in the flowchart can be performed, for example, on the server 106 described with reference to FIG. 1. The operations include receiving files related to a job of rendering a frame (602). This operation can be substantially same as the operation 502 described above with reference to FIG. 5. Operations also include identifying a set of resources for executing the job. This can include, for example, parsing a received scene file and identifying a rendering application needed to perform the rendering requested in the job. Identifying the set of resources can also include identifying an operation system associated with the job. For example, a determination can be made that a Maya® rendering application running on Linux is needed for executing the rendering job.

The operations can include causing the job to be executed on a virtual machine that includes the set of resources (606). In some implementations, a suitable virtual machine can be selected from a pool of idle virtual machines available to the server. The pool can include virtual machines obtained or set-up based on requests from various users, but no longer being used by the respective users. For example, if a virtual machine, running a Maya® rendering application on Linux and with an hour of usage time, was set up for a user, and the user actually used only thirty-five minutes, the virtual machine along with the twenty-five minutes of remaining usage time can be placed in the pool. If another user requests for a virtual machine running the Maya® rendering application on Linux, the above mentioned virtual machine from the pool can be selected to service the job request of the other user. In case the other user requires some additional resources, the additional resources can be installed on the virtual machine selected from the pool prior to being assigned to the other user. If the other user's job requires more time than the twenty-five minutes available on the virtual machine, the remaining part of the job can be completed on the same virtual machine by renewing the lease for the virtual machine. Alternatively, the remaining part of the job can be completed on another suitable virtual machine selected from the pool.

Figure 7:
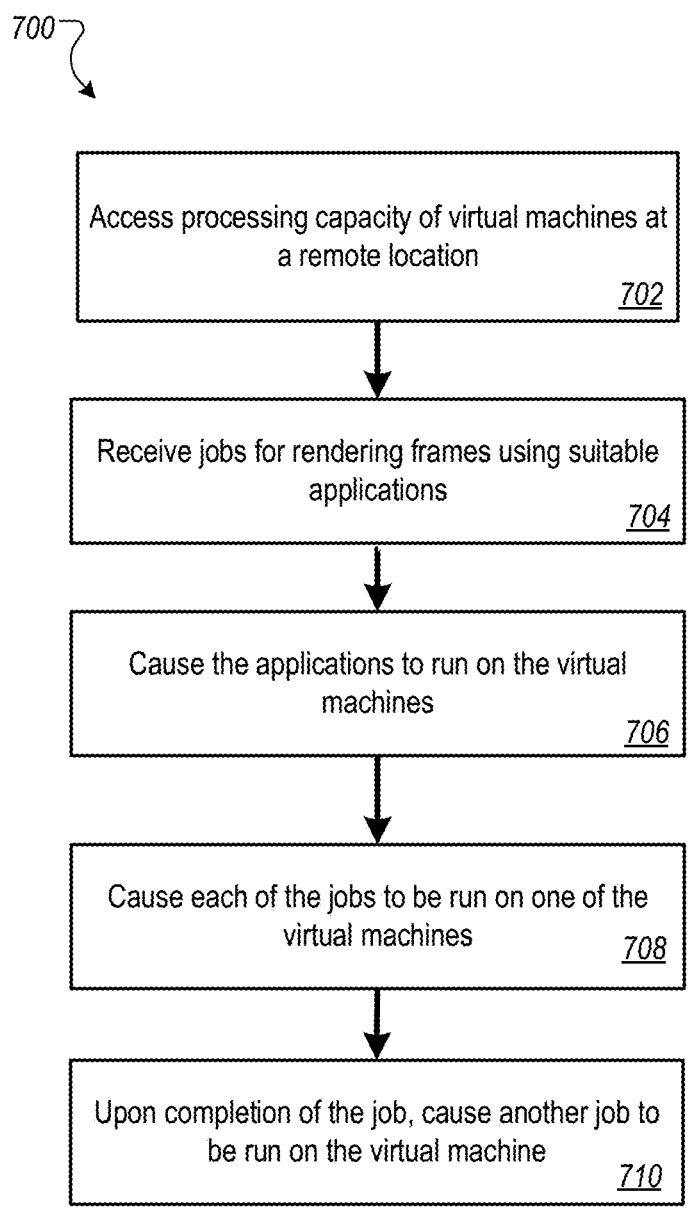
FIG. 7 is a flowchart depicting an example sequence of operations for executing applications on virtual machines.

FIG. 7 shows a flowchart 700 depicting an example sequence of operations for executing applications on virtual machines. The operations can be performed, for example at the server 106 described with reference to FIG. 1. The operations can include accessing a processing a capability of virtual machines at a remote location (702). The remote location can include, for example, a cloud-computing server from which computing resources such as processing capabilities, memory and storage are provided as a service. In some implementations, the remote location can be a physical server that can be accessed by the server 106. The virtual machines can be accessed over a network such as the Internet.

The operations also include receiving jobs for rendering frames using suitable applications (704). The jobs can be received from users over a network. The suitable applications include features for rendering frames of the respective jobs. The operations also include causing the applications to run on the virtual machines (706) and causing the each of the jobs to be run on one of the virtual machines (708). The operations further include causing another job to be run on the virtual machine when the initial job is complete (710). The use of the applications can be paid for on the basis of the amount of time that the applications are used for rendering jobs. The users of the application can be charged on the basis of standardized units of time that are no longer than one hour each.

Figure 8:
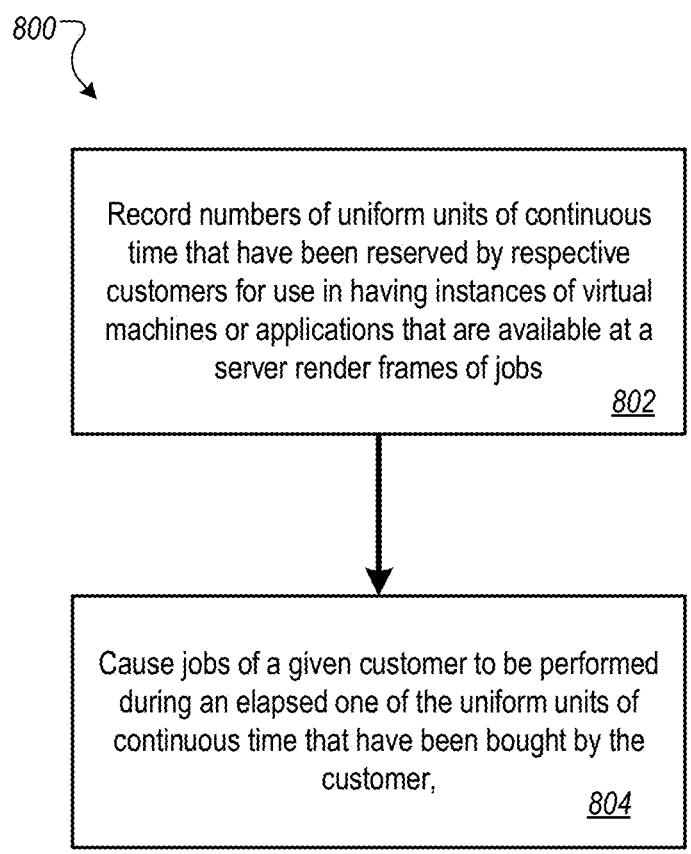
FIG. 8 is a flowchart depicting an example sequence of operations for providing rendering services to customers.

FIG. 8 shows a flowchart 800 depicting an example sequence of operations for providing rendering services to customers. The operations depicted in the flowchart 800 can be performed, for example by the server 106 described with reference to FIG. 1. The operations include recording numbers of uniform units of continuous time that have been reserved by respective customers for use in having instances of applications or virtual machines that are available at a server render frames of jobs (802). The jobs can be submitted by the customers through a network to the server. The units of time can be shorter than a predetermined time period such as an hour, or ten minutes.

The operations can also include causing jobs of a given customer to be performed during an elapsed one of the uniform units of continuous time that have been bought by the customer (804). The jobs of the customer that are performed during the elapsed unit of continuous time can require less actual time than the elapsed time of the unit. In some implementations, each of the customers can be charged for the uniform units of continuous time at a full standard price per unit when the actual amount of time used by the customer during each of the elapsed units of time is less than the uniform units. In some implementations, an instance that is available at the server can be caused to perform jobs of two or more customers during an elapsed period of time that corresponds to the length of each of the uniform units of continuous time. In some implementations, a use of the instance can be paid for on the basis of actual elapsed amounts of time during which the instance is used for the rendering jobs without regard to the uniform units of continuous time for which the customers are charged. For example, if a customer is charged for an hour of virtual machine use time, but ends up actually using only forty-five minutes, a provider of the virtual machine can still be compensated for the actual forty-five minutes of usage.

Figure 9:
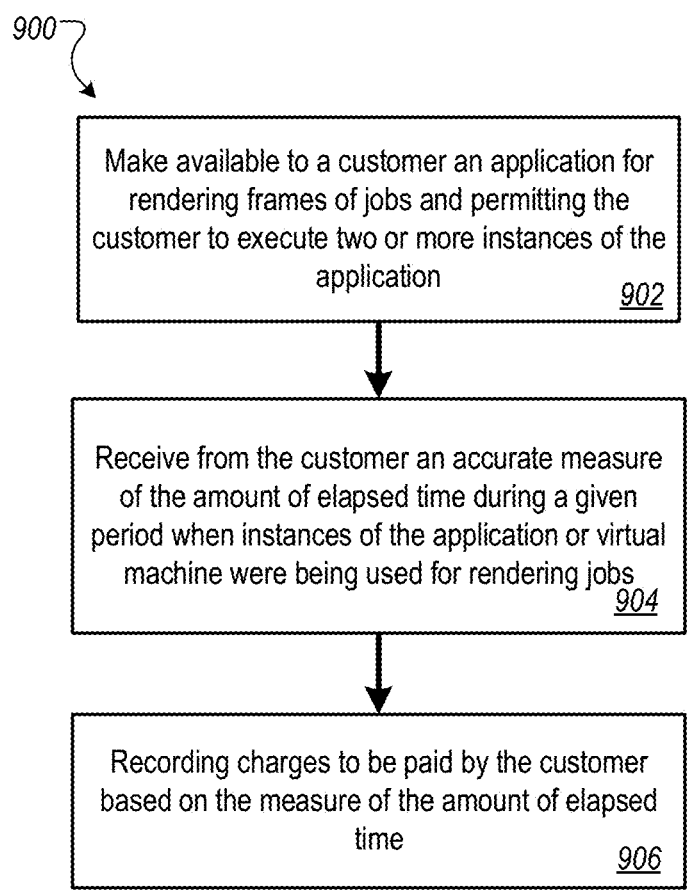
FIG. 9 is a flowchart depicting an example sequence of operations for determining charges pertaining to a use of an application.

FIG. 9 shows flowchart 900 depicting an example sequence of operations for determining charges pertaining to a use of an application. The operations can be performed, for example, by the server 106 described in FIG. 1. The operations include making available to a customer an application or a virtual machine for rendering frames of jobs and permitting the customer to execute two or more instances of the application or virtual machine (902). The application or virtual machine can be made available electronically, for example, at a server.

The operations can also include receiving from the customer an accurate measure of the amount of elapsed time (902). The elapsed time can be measured during a given period when instances of the application or virtual machine were being used for rendering jobs. The operations further include recording charges to be paid by the customer based on the measure of the amount of elapsed time, without regard to the number of instances being used or the calendar period over which the instances were being used. In some implementations, the accurate measure can include a measure of the minutes during which instances of the application were executing features associated with the rendering of the jobs.

Figure 11:
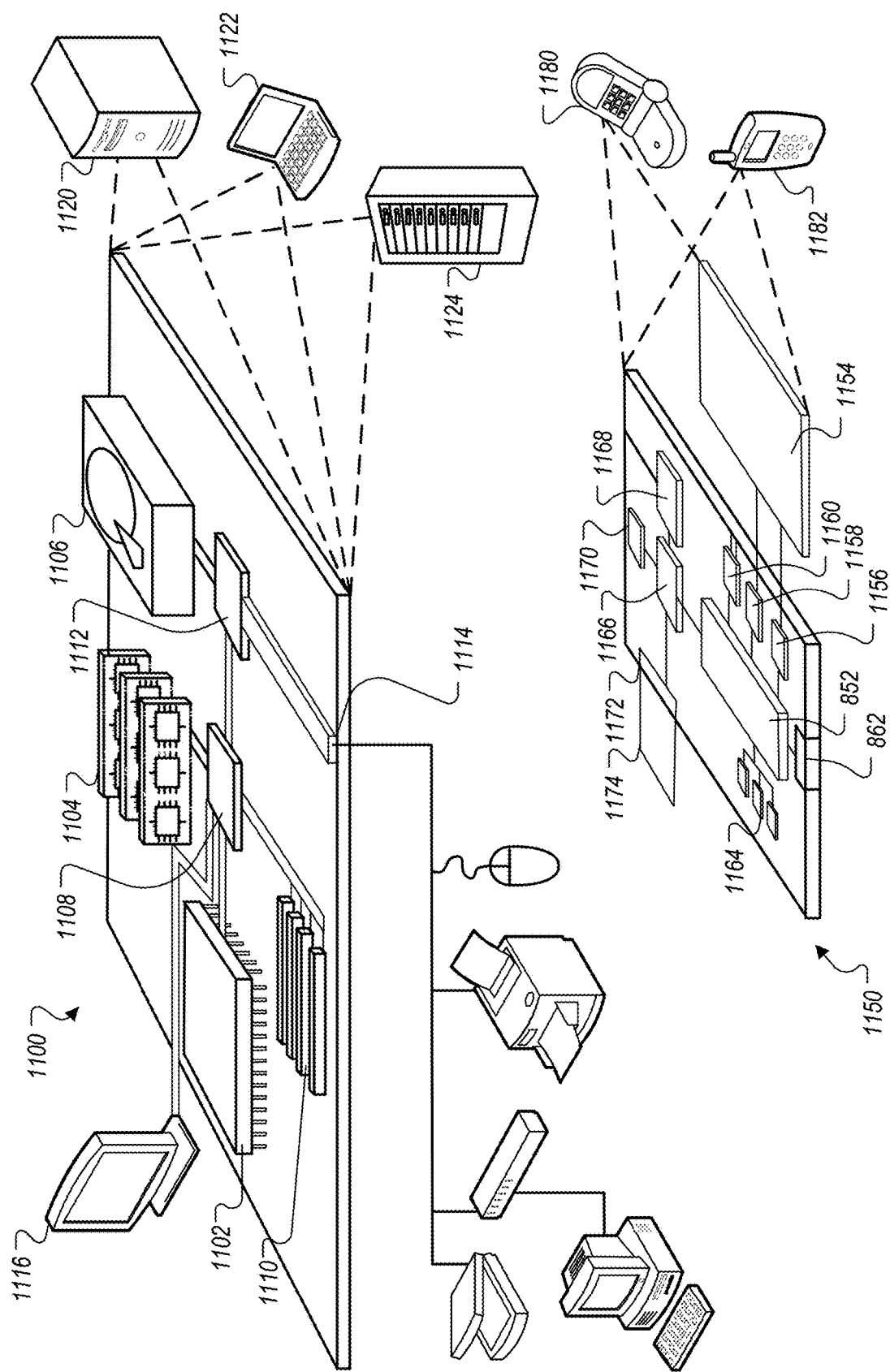
FIG. 11 is a diagram of a computing device.

FIG. 11 shows an example of a computing device 1100 and a mobile device 1150, which may be used with the techniques described here. Referring to FIG. 1A, the computing device 104 could be examples of the computing device 800 or the mobile device 800, and the server 106 could include one or more computer devices 800. Referring to FIG. 1B, one or more of the subsystems, such as the master control engine 152, the job control engine 154, and the data control engine 156 can include one or more of the computing devices 800. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 606. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system). In some implementations the computing device can include a graphics processing unit. The computing device 1100 can also be configured to execute applications such as the image-editing application 118 and the client application 120 described with reference to FIG. 1A.

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. Referring to FIG. 1A, the storage devices 112, 114, or 116 could be examples of the storage device 1106. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, memory on processor 1102, or a propagated signal.

The high speed controller 1108 manages bandwidth-intensive operations for the computing device 1100, while the low speed controller 1112 manages lower bandwidth-intensive operations. Such allocation of functions is an example only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user-interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, memory on processor 1152, or a propagated signal that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, and so forth) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user-interface or a Web browser through which a user can interact with an implementation of the systems and techniques described here), or any combination of such back end, middleware, or front end components. The components of the system can be interconnected by any form or medium of digital data communication (e.g., a network such as the network 102 described with reference to FIG. 1A). Examples of networks include a local area network ("LAN"), a wide area network ("WAN"), and the Internet.

The computing system can include clients and servers. A client and server are generally remote from each other and typically interact through a communication network such as the network 102. The relationship of client and server arises by virtue of computer programs running on the respective computers and having a client-server relationship to each other.

Other implementations are also within the scope of the following claims.

What is claimed is:

1. A method comprising:
   determining that an available virtual machine from among a pool of virtual machines has been idle for a period of time that satisfies a threshold, the available virtual machine comprising one or more resources required for executing a first job request type;
   in response to determining that the available virtual machine from among the pool of virtual machines has been idle for the period of time that satisfies the threshold, installing additional resources on the available virtual machine, the additional resources required for executing a second job request type; and
   after installing the additional resources on the available virtual machine:
     receiving, at a server, a job request comprising files to render frames via an image-editing application, the job request submitted by a customer via a network and configured to execute on a virtual machine from among the pool of virtual machines that includes resources required for executing the second job request type;
     identifying, based on the received job request, that the available virtual machine with the installed additional resources from among the pool of virtual machines includes the resources required for executing the second job request type; and
     executing, using the available virtual machine with the installed additional resources, the received job request.

2. The method of claim 1, wherein executing the received job request comprises reserving the available virtual machine for a uniform unit of continuous time.

3. The method of claim 2, wherein the uniform unit of continuous time is shorter than ten minutes.

4. The method of claim 2, further comprising charging the customer for the uniform unit of continuous time at a full standard price per the uniform unit of continuous time when an actual amount of time used for executing the received job request is less than the uniform unit of continuous time.

5. The method of claim 2, further comprising paying for the actual time period for which the received job request executes without regard to the uniform unit of continuous time.

6. The method of claim 1, further comprising executing, using the available virtual machine with the installed additional resources, job requests received from two or more customers during a period of time that corresponds to a uniform unit of continuous time.

7. A system comprising:
   a storage device; and
   a computing device connected to the storage device, the computing device comprising memory and a processor, the computing device configured to:
     determine that an available virtual machine from among a pool of virtual machines has been idle for a period of time that satisfies a threshold, the available virtual machine comprising one or more resources required for executing a first job request type;

in response to determining that the available virtual machine from among the pool of virtual machines has been idle for the period of time that satisfies the threshold, install additional resources on the available virtual machine, the additional resources required for executing a second job request type; and after installing the additional resources on the available virtual machine:

receive, at a server, a job request comprising files to render frames via an image-editing application, the job request submitted by a customer via a network and configured to execute on a virtual machine from among the pool of virtual machines that includes resources required for executing the second job request type;

identify, based on the received job request, that the available virtual machine with the installed additional resources from among the pool of virtual machines includes the resources required for executing the second job request type; and execute, using the available virtual machine with the installed additional resources, the received job request.

8. The system of claim 7, wherein executing the received job request comprises reserving the available virtual machine for a uniform unit of continuous time.

9. The system of claim 8, wherein the uniform unit of continuous time is shorter than ten minutes.

10. The system of claim 8, wherein the computing device is further configured to charge the customer for the uniform unit of continuous time at a full standard price per the uniform unit of continuous time when an actual amount of time used for executing the received job request is less than the uniform unit of continuous time.

11. The system of claim 7, wherein the computing device is further configured to execute, using the available virtual machine with the installed additional resources, job requests received from two or more customers during a period of time that corresponds to a uniform unit of continuous time.

12. A computer program product comprising a computer readable storage device encoded with instructions, which upon execution by one or more processors, causes operations comprising:

determining that an available virtual machine from among a pool of virtual machines has been idle for a period of time that satisfies a threshold, the available virtual machine comprising one or more resources required for executing a first job request type;

in response to determining that the available virtual machine from among the pool of virtual machines has been idle for the period of time that satisfies the threshold, installing additional resources on the available virtual machine, the additional resources required for executing a second job request type; and after installing the additional resources on the available virtual machine:

receiving, at a server, a job request comprising files to render frames via an image-editing application, the job request submitted by a customer via a network and configured to execute on a virtual machine from among the pool of virtual machines that includes resources required for executing the second job request type;

identifying, based on the received job request, that the available virtual machine with the installed additional resources from among the pool of virtual machines includes the resources required for executing the second job request type; and executing, using the available virtual machine with the installed additional resources, the received job request.

13. The computer program product of claim 12, wherein executing the received job request comprises reserving the available virtual machine for a uniform unit of continuous time.

14. The computer program product of claim 13, wherein the uniform unit of continuous time is shorter than an hour.

15. The computer program product of claim 13, wherein the uniform unit of continuous time is shorter than ten minutes.

16. The computer program product of claim 13, wherein the operations further comprise charging the customer for the uniform unit of continuous time at a full standard price per the uniform unit of continuous time when an actual amount of time used for executing the received job request is less than the uniform unit of continuous time.

17. The computer program product of claim 13, wherein the operations further comprise paying for the actual time period for which the received job request executes without regard to the uniform unit of continuous time.

18. The computer program product of claim 12, wherein the operations further comprise, executing, using the available virtual machine with the installed additional resources, job requests received from two or more customers during a period of time that corresponds to a uniform unit of continuous time.

* * * * *